July 8, 1969   J. DORY   3,454,922
ULTRASONIC PULSE DISTANCE MEASURING DEVICE
Filed Oct. 30, 1967

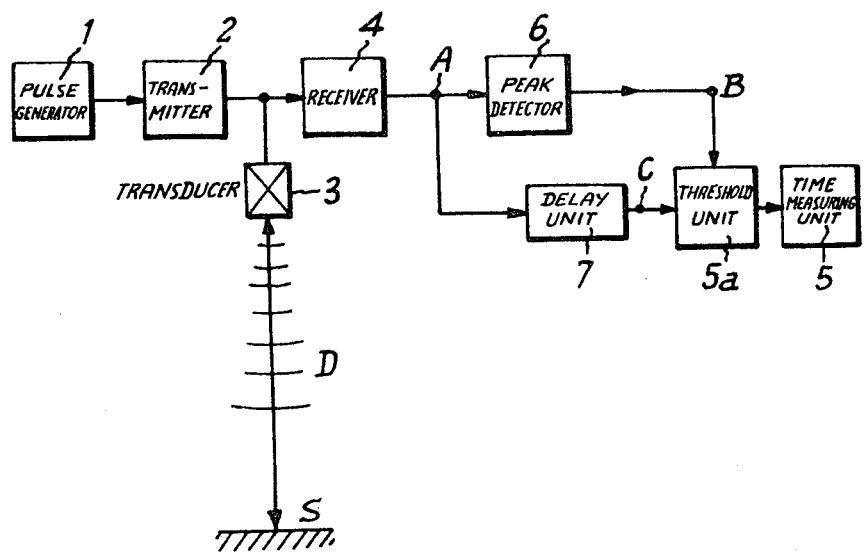
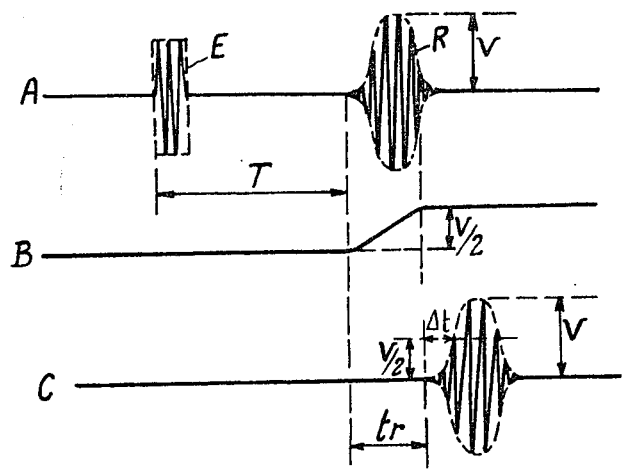

United States Patent Office 3,454,922
Patented July 8, 1969

3,454,922
ULTRASONIC PULSE DISTANCE MEASURING DEVICE
Jacques Dory, Meaux, France, assignor to Corporation Realisations Ultrasoniques, Meaux, France, a limited company
Filed Oct. 30, 1967, Ser. No. 678,929
Claims priority, application France, Nov. 8, 1966, 82,864
Int. Cl. G01s *9/66;* H04b *13/00*
U.S. Cl. 340—1                                    4 Claims

ABSTRACT OF THE DISCLOSURE

The invention broadly relates to ultransonic pulse distance measuring devices including time measuring means for determining the time interval between a transmitted pulse and the corresponding echo. More particularly, the instant invention relates to a device which comprises a peak detector, connected at the output of the echo receiver, gating means connecting said peak detector to the time measuring means, and means for applying to said gating means a further echo having a predetermined time lag with respect to that which is provided by the echo receiver, whereby the time measuring means are released when the echo amplitude has reached a predetermined fraction of its peak value, which avoids errors in the said time determination.

---

Figure 3:
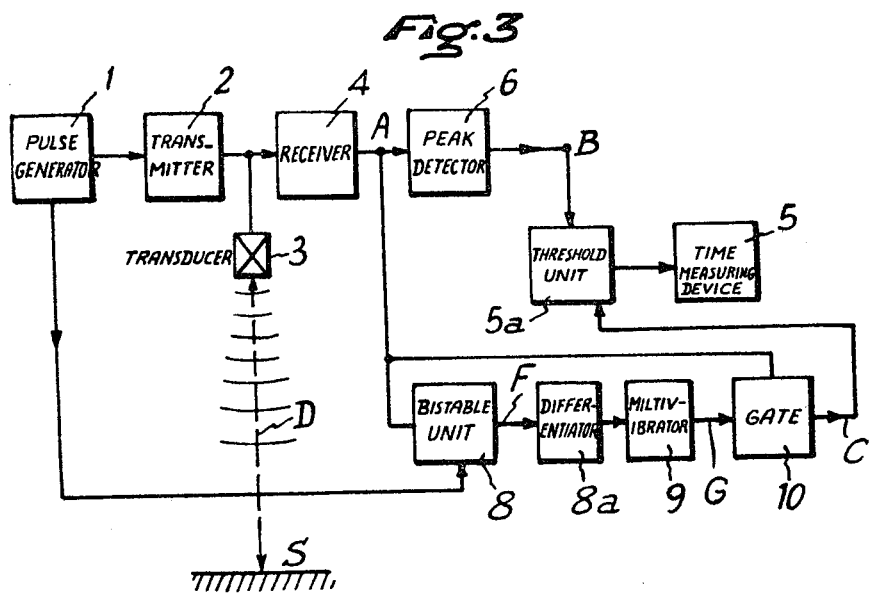

The invention relates to the measurement of distances or, more generally, to the determination of the position of any surface separating two different media, carried out by measuring the time taken by an ultransonic pulse to carry out a go and return propagation between the transmitter-receiver surface of a transducer and the surface whose position it is desired to know. As well known in the art, this time measurement can be made through digital means, i.e. through counting clock pulses during the time to be measured or through analog means, i.e. the measurement of the amplitude reached during said time by a continuous voltage the amplitude of which increases in accordance with a predetermined law.

It is clear that the accuracy of the measurement depends, as far as the digital process is concerned, on the instant at which counting is stopped and, as far as the analog process is concerned, on the instant at which production of the continuous voltage is stopped. Now, the instant of release itself evidently depends on the shape of the echo pulse reflected on the surface whose position it is desired to know.

In practice, this reflected echo pulse has rounded edges, even through the electric pulse which drives the transducer is perfectly rectangular. This results in the release occuring with a slight time lag which varies as a function of the duration of the rising edge of the echo and especially of the amplitude of the said echo, which is itself a function of the distance to be measured. In short, the data provided by the apparatus are not linear, the time lag increasing with distance.

It is known to provide a correction by varying the gain of the echo receiver as a function of time, so as to compensate for the amplitude attenuation of the reflected echo.

However, when relatively large distances are to be measured, especially in gas media, the echo signal detected by the receiver undergoes large and erratic amplitude variations which cannot be corrected using the above indicated method and which are capable of causing unacceptable errors of measurement.

Therefore, it is an object of the present invention to provide a method which eliminates this source of error by releasing the time measurement circuit at the instant at which the amplitude of the echo has reached a predetermined fraction of its peak value, an instant which, in practice, remains the same whatever said peak value may be.

It is another object of the invention to provide an ultrasonic pulse distance measuring apparatus of the character described which further comprises a peak detecter, connected at the output of the echo receiver and whose output voltage, which is proportional to the echo peak amplitude, is applied to the time measuring circuit through gating means adapted to regulate its release threshold at a level equal to a predetermined fraction of the said echo peak amplitude, and means for applying to said gating means a further echo having a predetermined time lag with respect to that which is provided by the echo receiver.

According to a preferred embodiment of the invention, this further echo is preferably obtained by transmitting, at each operating cycle of the apparatus, a pair of ultrasonic pulses, having, the one with respect to the other, said predetermined time lag, and by cancelling the echo originating from reflection of the first pulse of the pair, by means of a selecting device which connects the receiver to the gating means.

These and other objects as well as the advantages of the invention will appear more clearly from the following description.

Figure 4:
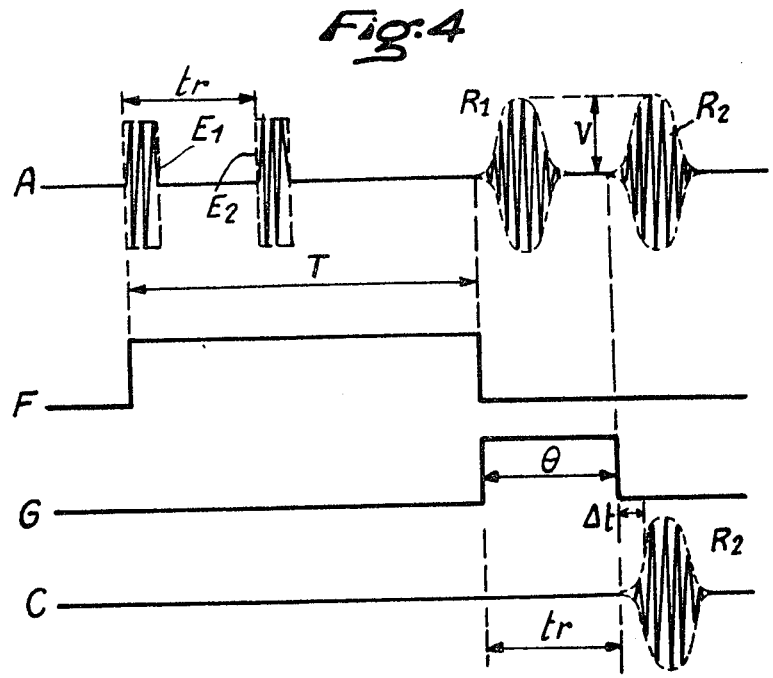

In the appended drawings:

FIGURE 1 is a block diagram of an apparatus according to the invention, whose operation is illustrated by FIGURE 2, and FIGURE 3 is a block diagram of an apparatus according to the preferred embodiment of the invention, whose operation is illustrated by FIGURE 4.

The apparatus shown in FIGURE 1 comprises a recurrent electric pulse generator 1 which synchronizes an ultrasonic frequency transmitter 2 pulse modulated by generator 1. The ultrasonic recurrent pulses thus obtained energize a transducer 3, which directs an ultrasonic beam onto reflecting surface S whose distance D to the transmitter-receiver surface of the transducer is being measured. The reflected pulses, as well as the transmitter pulses, are received by a receiving device 4 and transmitted to a time-measuring device 5.

The part of the apparatus just described is well known. Device 5 may be eiher of the analog type or of the digital type.

In brief, the analog type of time measuring unit may consist of a generator providing a continuous saw-tooth or stairway-shaped voltage whereas the digital type of time measuring unit may consist of a clock pulse counter. The generation of said voltage, or the counting operation, will be initiated for instance at the time of the electronic pulse emission whereas unit 5 will be released, i.e., the amplitude of the voltage or the count of the counter, will be determined, at the time when a releasing signal the amplitude of which exceeds a predetermined threshold is applied to the input of unit 5.

In prior art apparatuses, the releasing signal is the echo, and it results that the releasing time is variable, as explained hereinabove.

In the apparatus presently described, however, the releasing signal is provided at a well defined time by a threshold unit 5a, as will be explained hereinafter. It must be well understood that the invention applies, in a general manner, to any type of device for the measurement of distances through reflection of ultrasonic pulses and that it exclusively embraces the device for the correction of errors due to the shape of the pulses, which device is now going to be described.

This device essentially comprises a peak detector 6, a delay unit 7 and a threshold regulation unit 5a. The peak detector is of a well known type, for example, a diode rectifier whose time constant is determined by a capacitor. Its output circuit is mounted as a voltage divider so as to produce an output voltage V/2, V being the echo peak amplitude. The delay unit may consist of a simple delay line or still better, may be arranged in the manner to be described with reference to FIGURE 3. The threshold regulating unit 5a may consist either of a bi-stable unit or of a very high gain differential amplifier. In both cases, it generates, at its output, a pulse of constant amplitude which is sufficient to trigger the time measurement unit itself (i.e., which exceeds the above mentioned threshold). Said output pulse is generated each time signals B and C, respectively applied to both inputs thereof, simultaneously have an amplitude V/2.

FIGURE 2 shows the waveforms of signals taken at points designated by the corresponding letters in FIGURE 1. It can be seen at A that echo pulse R reflected on surface S has rounded edges, even though the transmitted pulse E is perfectly rectangular. As is well known, unit 5 measures time interval T, which is proportional to the distance D to be measured, separating the transmitted pulse from the reflected echo. In prior art devices, as device 5 has a predetermined release threshold, in fact, measurement of T involves an error which is equal to the time taken by the rising edge of the reflected echo to reach said threshold. This error evidently depends on the steepness of the echo edge which can vary considerably as indicated above. In the apparatus described, however, the time measuring unit 5 will be released each time that the amplitude of the echo signal R will reach a predetermined fraction, for example ½, of its variable peak value V. In practice, the echo is distorted, from one probing cycle to the next, as a result of a change in the scale of ordinates without any modification of the abscissae so that the time $\Delta t$ taken by its rising edge to reach a given fraction of its peak amplitude is constant, whatever this peak amplitude may be (waveform C, FIGURE 2).

It is quite evident that, in order to trigger the threshold regulating unit 5a, it is necessary for the voltage V/2 to be already established at the output of detector 6 at the instant at which the amplitude of the echo applied to the coincidence threshold unit 5a reaches a value of V/2. This is why it is necessary to delay the echo by a time $t_r$ (waveform C). It will be noted that device 5 in fact measures time $t+\Delta t$; but since $\Delta$ has a constant value throughout the entire measurement, it is easy to take it into account in the result.

In the preferred embodiment of FIGURE 3, the delay line, which is very costly, is omitted and substituted by units 8, 8a, 9, 10.

The device illustrated in FIGURE 3 includes the same units 2, 3, 4, 5, 5a and 6 as in FIGURE 1, but the delay line 7 is replaced by a circuit consisting essentially of a bistable unit 8, a monostable multivibrator 9, and a coincidence device or gate 10.

Transmitter 2 transmits at each cycle, as shown by the waveform A (FIG. 4), two identical successive pulses $E_1$ and $E_2$, separated by a time interval $t_r$ (for example, equal to several milliseconds). This results in the reception of two echoes $R_1$, $R_2$ separated by this same time interval.

The bistable unit 8 generates square waves F whose leading edge is synchronized by the first pulse $E_1$ and whose trailing edge is synchronized by the first echo $R_1$. A differentiating unit 8a which is, in practice, part of the output circuit of the bistable unit 8 converts, through differentiation, both of these edges into pulses of opposed polarities, and only transmits the pulse corresponding to the trailing edge (unit 8a comprises, for this purpose, a diode, which eliminates the other pulse).

The monostable multivibrator 9 is triggered by the trailing edge of square wave F, for a fixed predetermined time so selected that the trailing edge of square wave G generated by the multivibrator falls between the two echoes $R_1$ and $R_2$, as illustrated in FIG. 4. This results in the selection of echo $R_2$ by the gate 10, which it transmits to the threshold regulating device 5a. The remainder of the device functions like the one in FIGURE 3: it can be seen that circuit 8-9-10 furnishes a waveform C consisting of echoes delayed by a time $t_r$ with respect to echoes $R_1$. Detector 5a provides the peak value of the said delayed echoes.

It is to be understood that various modifications may be made to the device as described and illustrated, without departing from the spirit and scope of the invention.

What is claimed is:

1. An ultrasonic pulse distance measuring device comprising a transmitter of recurrent ultrasonic pulses, a receiver of echoes originating from the reflection of said pulses onto the surface whose position it is desired to determine, said receiver having an output, and time measuring means for determining the time interval separating the transmission of an ultrasonic pulse from the reception of the corresponding echo, said time measuring means having a release control input, said device further comprising a peak detector having an input connected to the output of the receiver, said peak detector having an output, gating means having an output connected to the release control input of the time measuring means, said gating means having a first input connected to the output of the peak detector and a second input, and time delay means connecting the output of the receiver to the second input of the gating means.

2. An ultrasonic pulse distance measuring device as claimed in claim 1, wherein said transmitter is adapted to generate recurrent pairs each including first and second ultrasonic pulses, the second pulse having a predetermined time lag with respect to the first one, said time delay means including selecting means for cancelling the echo originating from the reflection of the second ultrasonic pulse onto the surface whose position it is desired to determine.

3. An ultrasonic distance measuring device as claimed in claim 1, wherein said delay means essentially consist of a delay line.

4. An ultrasonic distance measuring device as claimed in claim 2, wherein said selecting means essentially consist of a bistable unit having an output, a first input connected to the output of said transmitter and a second input connected to the output of said receiver, a differentiator having an input connected at the output of said bistable unit and an output, a monostable multivibrator having an input connected to the output of the differentiator and an output, and a gate having an output connected to the second input of the gating means, said gate having a first input connected to the output of the receiver and a second input connected to the output of the monostable multivibrator.

References Cited

UNITED STATES PATENTS

| 3,134,103 | 5/1964 | Flower | 343—13 X |
| 3,216,012 | 11/1965 | Hirsch | 343—13 |
| 3,387,256 | 6/1968 | Warner et al. | 340—3 |

RICHARD A. FARLEY, *Primary Examiner.*

U.S. Cl. X.R.

340—3; 343—13